United States Patent [19]

Johnson et al.

[11] Patent Number: 5,914,705

[45] Date of Patent: Jun. 22, 1999

[54] APPARATUS AND METHOD FOR PROVIDING DETENT-LIKE TACTILE FEEDBACK

[75] Inventors: Bertrand Harold Johnson, Murray Hill; George Knoedl, Jr., Milford, both of N.J.

[73] Assignee: Lucent Technologies Inc., Murray Hill, N.J.

[21] Appl. No.: 08/600,645

[22] Filed: Feb. 9, 1996

[51] Int. Cl.$^6$ ........................................................ G09G 5/08
[52] U.S. Cl. ................................................................ 345/163
[58] Field of Search ........................... 345/156, 163, 345/164, 167, 168, 173; 340/407.1, 407.2

[56] References Cited

U.S. PATENT DOCUMENTS

| | | |
|---|---|---|
| 4,334,280 | 6/1982 | McDonald . |
| 4,868,549 | 9/1989 | Affinito et al. . |
| 4,885,565 | 12/1989 | Embach . |
| 5,186,629 | 2/1993 | Rohen . |
| 5,189,390 | 2/1993 | Fagard . |
| 5,204,600 | 4/1993 | Kahkoska . |
| 5,223,793 | 6/1993 | Ricci et al. . |
| 5,296,871 | 3/1994 | Paley . |
| 5,299,810 | 4/1994 | Pierce et al. . |

FOREIGN PATENT DOCUMENTS

| | | |
|---|---|---|
| 0 489 469 A1 | 6/1992 | European Pat. Off. . |
| 0 556 999 A1 | 8/1993 | European Pat. Off. . |
| 06 148 494 | 5/1994 | Japan . |

OTHER PUBLICATIONS

European Search Report, EP 97 30 0693, Jul. 28, 1997.
IBM Technical Disclosure Bulletin, "Three-Dimensional Menu", vol. 29, No. 10, Mar. 1987.
IBM Technical Disclosure Bulletin, "Mouse Ball-Actuating Device With Force And Tactile Feedback", vol. 32, No. 9B, Feb. 1990, pp. 230-235.

Primary Examiner—Jeffery Brier
Assistant Examiner—David L Lewis

[57] ABSTRACT

An apparatus for providing detent-like tactile feedback to a user, comprising a shell, a rolling member rotatably provided within the shell, a motion sensing mechanism for determining displacement of the rolling member when the rolling member is rotated, at least one actuator situated within the shell and at least one brake member provided with respect to the at least one actuator, the at least one actuator retracting and extending the at least one brake member to selectively influence the rotation of the rolling member based on feedback from the embodying system.

7 Claims, 12 Drawing Sheets

APPARATUS AND METHOD FOR PROVIDING DETENT-LIKE TACTILE FEEDBACK

BACKGROUND OF THE INVENTION

1. Field of the Invention

The present invention relates to tactile feedback and, more particularly, to an apparatus and method for providing detent-like tactile feedback.

2. Description of the Related Art

Detent mechanisms are typically found on the shafts of rotary volume or channel selector switches such as, for example, those found on some televisions and radios. Such detent mechanisms are also used on the horizontal and vertical deflection factor controls on oscilloscopes and similar instruments.

FIG. 1A illustrates an example of a detent mechanism used on a conventional rotary switch. As shown, cam 1 includes a number of valleys 4 and hills 5 and is capable of rotating about shaft 7 in the directions indicated by arrows A. A spring loaded pawl, referred to generally as pawl 6, typically consists of a leaf-spring 3 and a ball bearing 2, with leaf-spring 3 urging ball bearing 2 toward cam 1. As cam 1 is rotated, pawl 6 causes cam 1 to favor a position at rest in which ball bearing 2 is positioned in one of the valleys 4. This type of detent mechanism offers a restoring force (e.g., a force opposite to the displacement of cam 1) when attempting to leave one of the stop positions in one of valleys 4. The effect is to guide the user's hand to a valid switch stop position.

Another mechanism that has been employed to obtain a detent action is illustrated in FIG. 1B. Ferro-magnetic spur wheel 12 includes spurs 13 and is rotatable about shaft 14 in the directions indicated by arrows B. A magnet 11, including south (10A) and north (10B) poles is provided in proximity with wheel 12. Due to magnetic action, the mechanism remains at rest when spurs 13 of spur wheel 12 are aligned with poles 10A and 10B of magnet 11. This type of detent mechanism also offers a restoring force when attempting to leave one of the stop positions.

Although such detent mechanisms may be suitable for use in rotary switches, such mechanisms have limited use for other applications requiring more than one degree of freedom. For example, it may be helpful to provide a detent mechanism on a cursor positioning device such as a track ball or mouse-like device to obtain a precise position of the cursor on a video display. However, one disadvantage of using the above-described mechanisms in a track ball or a mouse-like device which utilize movement of a ball to position the cursor, is that physical hills and valleys (or spurs) must be provided on the surface of the ball, to obtain the desired detent action. However, neither hills, valleys nor spurs may be employed on the surface of the ball, since the ball must be able to roll (in place) with ease in any direction. Hills or spurs on the surface of the ball would prevent continuous and straight movement of the ball. Small dimples on the surface of the ball may provide a solution. However, with the dimples affixed to the track ball the available stop positions and the directions to them are also fixed to the pattern of dimples, with the possibility of yielding no continuous "straight" paths. In addition, with the ball free to rotate with compound motions, the direction to the next detent stop position will keep changing.

An attempt has been made at providing a tactile feedback in a mouse-like input/output device. For example, U.S. Pat. No. 5,186,629 has addressed a tactile feedback that is sent to a mouse-like input/output device. The device is intended to provide computer output to blind computer users to visualize computer graphic images. In particular, a determination is made if an object has been located, by providing feedback to the mouse when a boundary (e.g., a boundary of a window or an image) is encountered. The feedback is in the form of a mild electrical impulse or a physical vibration. However, although this device may be useful to alert a user when a boundary is encountered, it is not particularly useful for providing a detent-like physical tactile feedback having dragging and/or restoring forces. That is, the above-referenced device does not provide a detent-like sensation similar to the sensation received using a physical cam and pawl.

Attempts have also been made at simulating detent action. For example, U.S. Pat. No. 5,204,600 relates to an apparatus and a method for simulating a mechanical detent in a manually operable rotary digital encoder used to control a display or a readout in an electronic system. In particular, the apparatus simulates tactile feedback of a physical detent by temporarily freezing the encoder output to the display or readout, when the encoder is rotated past a virtual preset point (e.g., a stop position). When the user rotates the encoder past the preset point, the system engages a time delay, during which the output from the encoder to the associated electronic system is maintained at the preset point value. The delay allows the user to stop the movement of the encoder to achieve a desired preset point value. However, even though this method and apparatus may be useful in achieving a virtual preset point value utilizing a display or a readout, the method is not particularly useful to obtain a periodic, physical detent-like tactile feedback.

Accordingly, it would be beneficial to provide a detent-like tactile feedback in a track ball-like or mouse-like input/output device.

SUMMARY OF THE INVENTION

Fine cursor control on a computer video display becomes difficult using a track ball, a mouse or other track ball-like input/output devices, since the user cannot anticipate the exact location of the next cursor stop point on the screen. Various embodiments of the present invention allow a user to fine tune the movements of the hand to control the cursor on a display, which may be especially useful, for example, in drawing and CAD/CAM software packages. With the present invention, the user is able to obtain a detent-like tactile feedback with a track ball-like or mouse-like input device, without the need for hills, valleys or magnets on the device. According to an embodiment of the present invention, the stop positions can be modified electronically to control the detent-like tactile feedback.

An apparatus for providing tactile feedback to a user includes a shell, a rolling member rotatably provided within the shell, a motion sensing mechanism for determining an amount of displacement of the rolling member when the rolling member is rotated and at least one actuator situated within the shell, at least one brake pad provided with respect to the at least one actuator. The actuator extends and retracts the associated brake pad to selectively limit rotation of the rolling member within the shell, based on the amount of displacement of the rolling member ball.

BRIEF DESCRIPTION OF THE DRAWINGS

So that one skilled in the art to which the subject invention appertains will better understand how to practice the present invention, preferred embodiments of the invention will be described in detail below with reference to the drawings wherein.

DESCRIPTION OF THE PREFERRED EMBODIMENTS

Figure 1A:
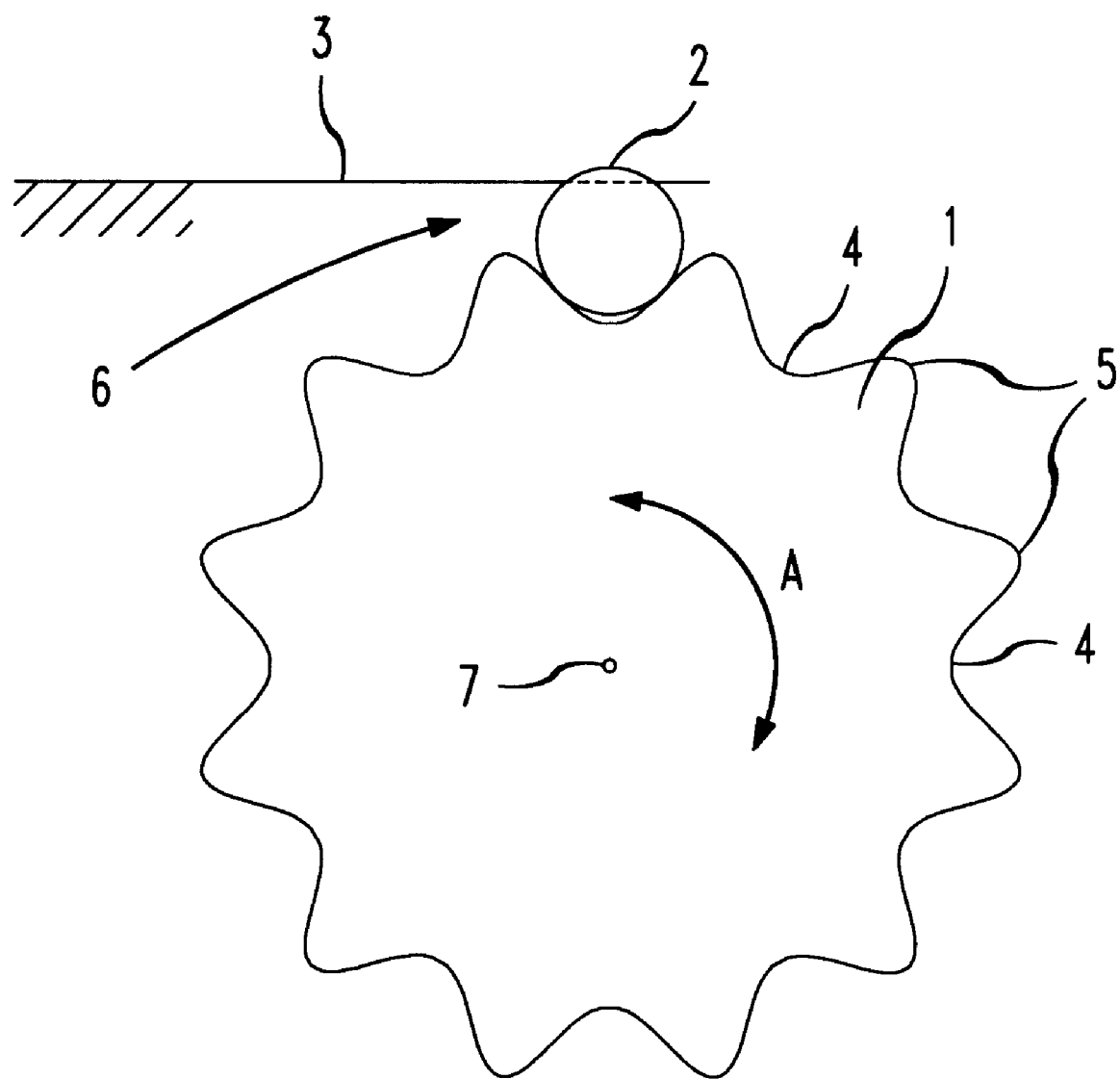
FIGS. 1A and 1B show prior art detent mechanisms.
Figure 1B:
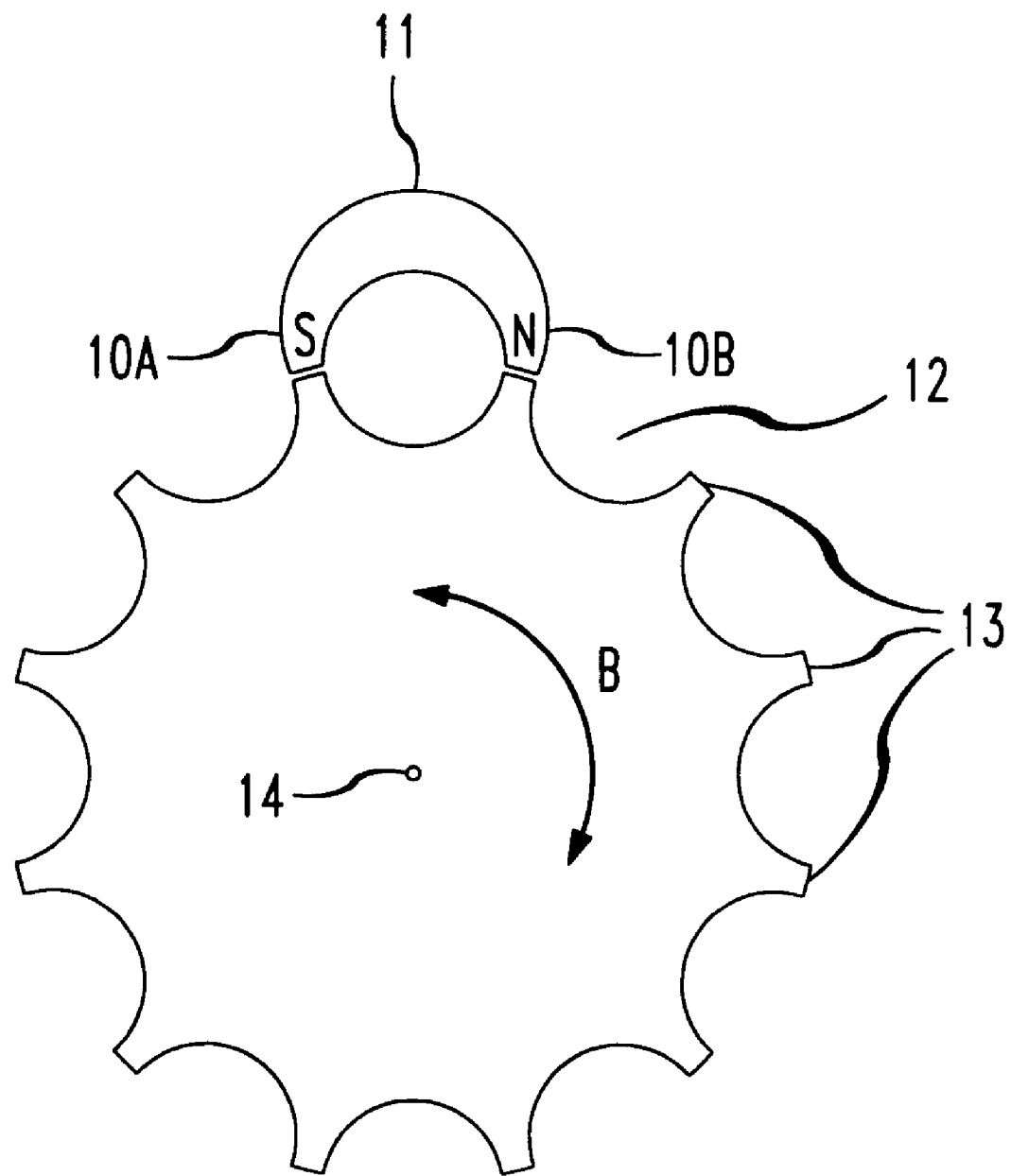
Figure 2A:
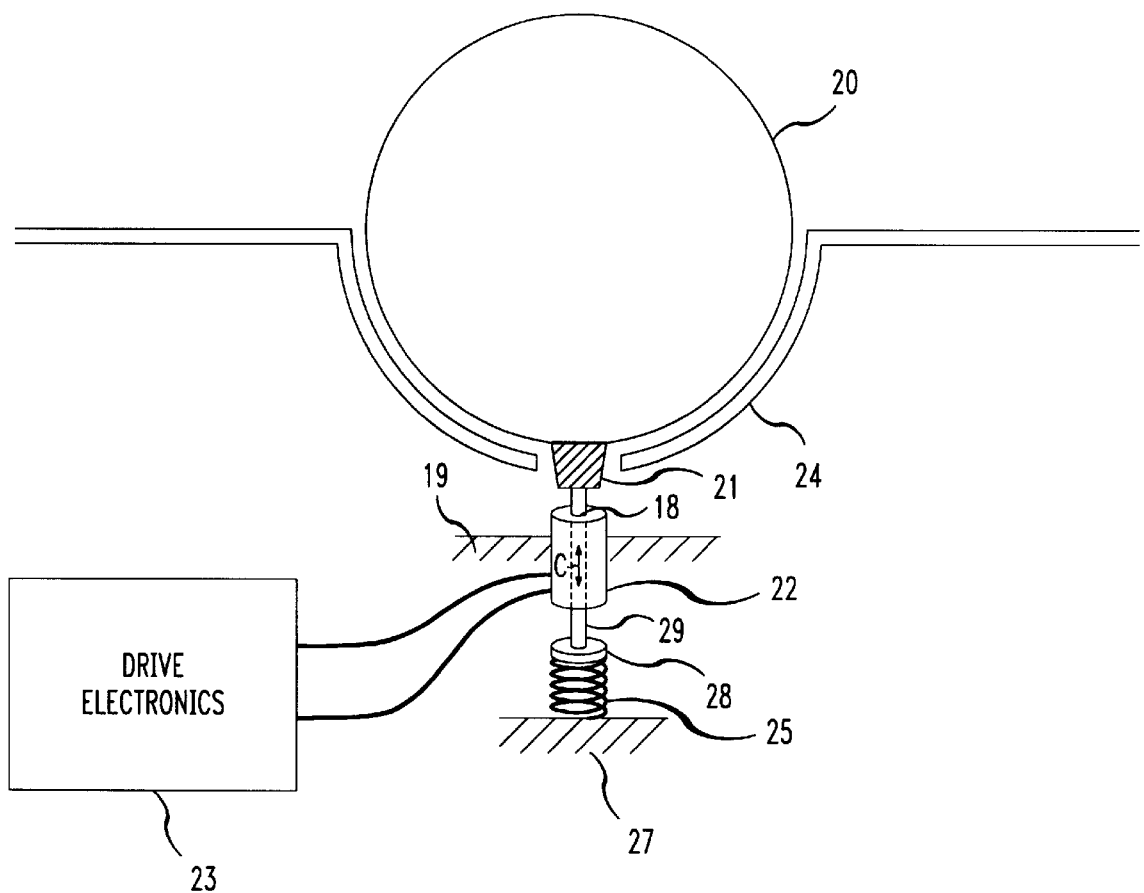
FIGS. 2A and 2B show devices for implementing detent-like tactile feedback, according to embodiments of the present invention.

Referring now in specific detail to the drawings, in which like reference numbers identify similar or identical elements, FIG. 2A depicts a synthesized detent mechanism for achieving a detent-like tactile feedback in a track ball input device, according to an embodiment of the present invention. The mechanism shown in FIG. 2A includes a rolling member such as track ball 20, drive electronics 23, solenoid/actuator 22, brake force loading spring 25, brake pad 21, push rod 29 with loading spring flange 28 and socket member 24 in which track ball 20 sits. Socket member 24 includes a low friction surface on which ball 20 rides.

Brake pad 21 is affixed to one end of push rod 29. At the other end of push rod 29, spring flange 28 rests on or is connected to brake force loading spring 25. Brake force loading spring 25 rests on or is attached to frame body 27 and applies loading force through push rod 29 to brake pad 21.

Push rod 29 is slidably positioned in guide hole 18 provided in solenoid/actuator 22 and, when selectively activated and deactivated, retracts and extends brake pad 21. Push rod 29 is capable of moving within guide hole 18 in the directions indicated by arrow C.

Drive electronics 23 will be described in more detail below. Briefly, however, when ball 20 moves a predefined amount, drive electronics 23 activate solenoid/actuator 22 momentarily which, in turn, retracts push rod 29 and compresses loading spring 25 against frame body 27. This action retracts brake pad 21, releasing braking drag from ball 20, allowing it momentarily to roll freely. After a predefined time interval, drive electronics 23 deactivate solenoid/actuator 22 which allows loading spring 25 to extend push rod 29 and brake pad 21, thus restoring braking drag to ball 20. This embodiment of the present invention provides a detent-like action to the ball that is pure drag and release with no restoring force. The sensation of a forward kick is experienced by the user's hand during the short release interval owing to the dynamics of human perception and motor system reaction, as will be explained in more detail later.

Of course, variations on this embodiment of the present invention are possible. For example, the embodiment of the present invention shown in FIG. 2B includes ball 20, socket member 24 in which track ball 20 sits, drive electronics 23, solenoid/actuator 22, push rod 29 and brake pad 21. Each of these elements is similar to the elements described above with respect to FIG. 2A. In this embodiment, however, a loading force is provided by the direct action of solenoid/actuator 22. When drive electronics 23 activate solenoid/actuator 22, push rod 29 extends and thereby urges brake pad 21 against ball 20 and pins ball 20. This embodiment also provides a detent-like action that is pure drag and release with no restoring force.

Figure 2B:
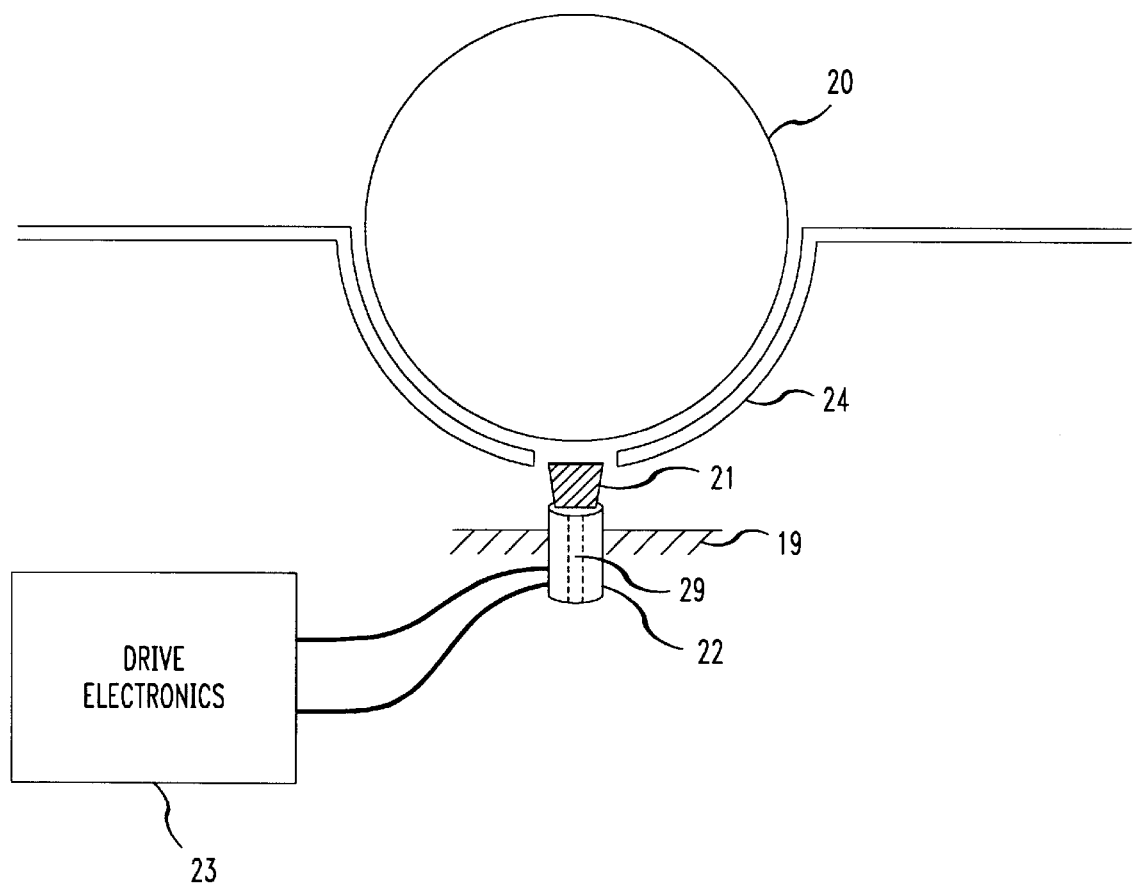
Figure 2C:
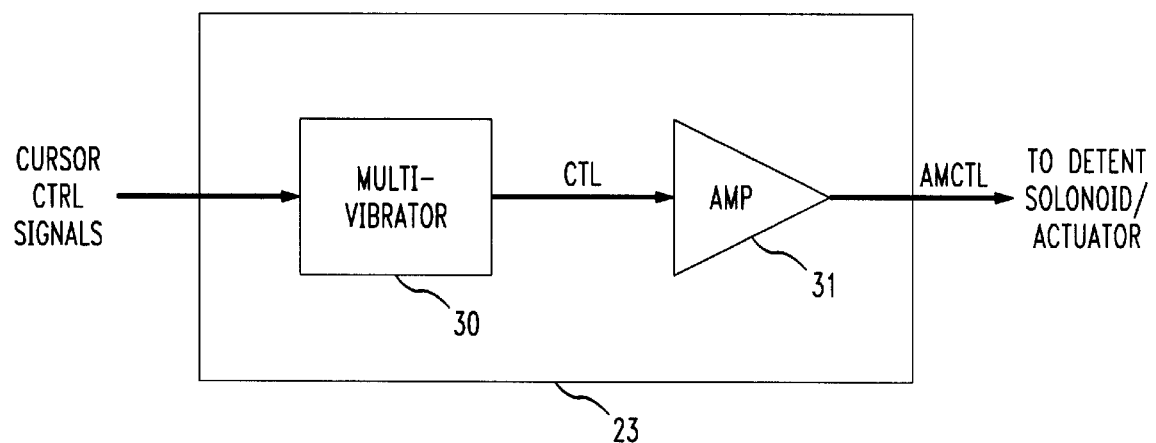
FIG. 2C is a block diagram of the drive electronics according to an embodiment of the present invention.

A block diagram of drive electronics 23 is shown in FIG. 2C. Drive electronics 23 include monostable multi-vibrator 30 and driving amplifier 31. Drive electronics 23 utilize standard cursor control signals coming from the cursor control device (e.g., the track ball or mouse) or from the computer. The cursor control signals are relayed to multi-vibrator 30, which generates and controls the duration of control signal (CTL) based on the values of a resistor and capacitor (RC) circuit, for example (not shown), used to design multi-vibrator 30. By varying the values of the resistor and/or capacitor, the duration of control signal CTL can be changed. Such monostable multi-vibrators are well known and will not be described in detail.

Control signal CTL is delivered to driving amplifier 31 which amplifies the control signal to provide sufficient current for driving solenoid/actuator 22. The amplified control signal (AMCTL) is provided to solenoid/actuator 22. Accordingly, each time a cursor control signal is issued, an AMCTL is issued which activates solenoid/actuator 22 and urges brake pad 21 away from or against ball 20.

Figure 3:
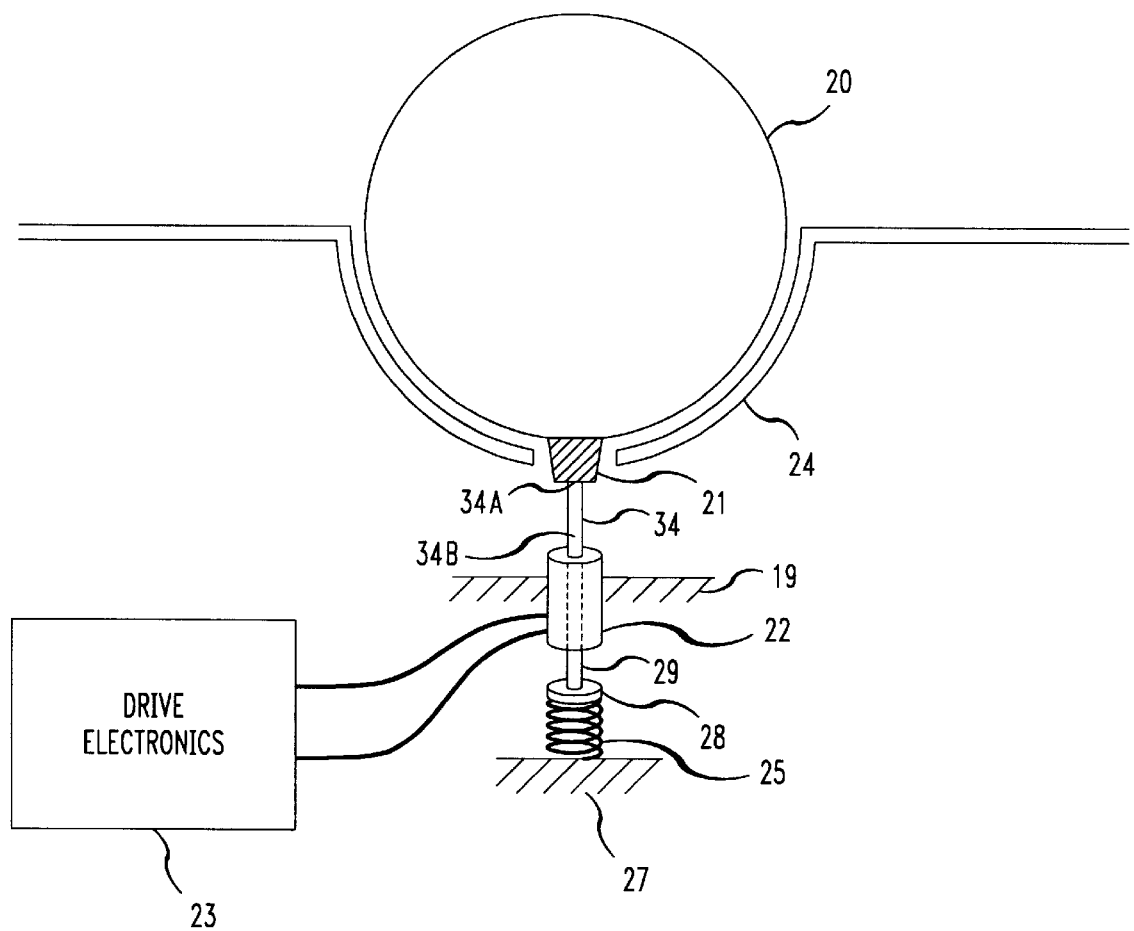
FIG. 3 shows a device for implementing detent-like tactile feedback, according to another embodiment of the present invention.

To obtain even closer to natural detent-like action and feel including a restoring force, another embodiment of the present invention is shown in FIG. 3. This embodiment includes track ball 20, brake pad 21, solenoid/actuator 22, drive electronics 23, brake force loading spring 25, push rod 29, loading spring plate 28 and socket member 24 in which track ball 20 rides. Each of these elements function similar to those elements described above with respect to FIG. 2A. However, according to this embodiment of the present invention, brake pad 21 is mounted to flexural spring member 34 having two ends 34A and 34B. One end 34B of flexural spring member 34 extends from push rod 29. The other end 34A is affixed to brake pad 21. When ball 20 is being rotated (e.g., by a user rotating the ball) flexural spring member 34 provides a restoring force to ball 20. That is, when track ball 20 is rolled, flexural spring member 34 deforms and provides a restoring force that is opposite to the direction of displacement of the ball and increases proportionately with the actual displacement. If during the application of the restoring force, the displacement of ball 20 (either by a finger, hand or other means) is stopped and ball 20 released, ball 20 will be returned by spring 34 to its previous pinned orientation.

After a predefined amount of displacement of ball 20, drive electronics 23 activate solenoid/actuator 22, momentarily retracting brake pad 21 and allowing flexural spring member 34 to relax. Since ball 20 is no longer pinned, the restoring force drops to zero. Again, owing to the dynamics of human perception and motor system reaction, the sensation of a forward kick is experienced by the user's hand. When brake pad 21 is brought back into contact with track ball 20 (by solenoid/actuator 22 being deactivated by drive electronics 23), because flexural spring member 34 is no longer deformed the restoring force is initially zero, with ball 20 being pinned at a new position/orientation. As track ball 20 is rolled continuously in the same direction, the restoring force will repeatedly grow and then drop.

Figure 4A:
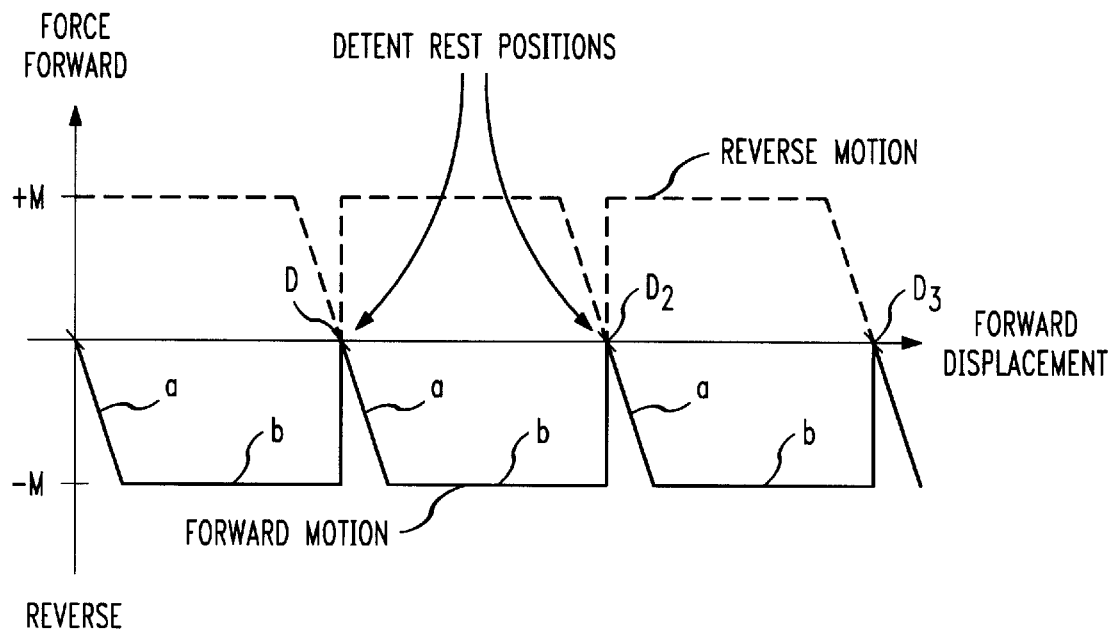
FIGS. 4A and 4B are force profile vs. displacement graphs.

FIG. 4A depicts the force profile vs. displacement according to one embodiment of the present invention. As indicated by solid lines, when ball 20 is displaced forward, drive electronics 23, based on the generated cursor control signals, leave solenoid/actuator 22 deactivated, allowing brake pad 21 to be forced against ball 20. This is depicted as position D, which is a detent rest position. As ball 20 is displaced, flexural spring member 34 provides a reverse force that rapidly increases with the amount of displacement (as indicated by portion a of the waveform) until it reaches maximum reverse force −M. This maximum reverse force −M depends, among other factors, on the strength of springs 25 and 34 and the amount of friction between ball 20 and brake pad 21. After maximum reverse force −M is reached, brake slippage occurs as indicated by portion b of the waveform. That is, after the maximum reverse force -M is reached, if sufficient force is applied to ball 20, it can be further displaced. After a predetermined amount of forward displacement, drive electronics 23 activates solenoid/actuator 22 momentarily, brake pad 21 is released and detent rest position $D_2$ is achieved. A similar waveform is achieved when reverse motion of ball 20 occurs, as indicated by dashed lines.

Figure 4B:
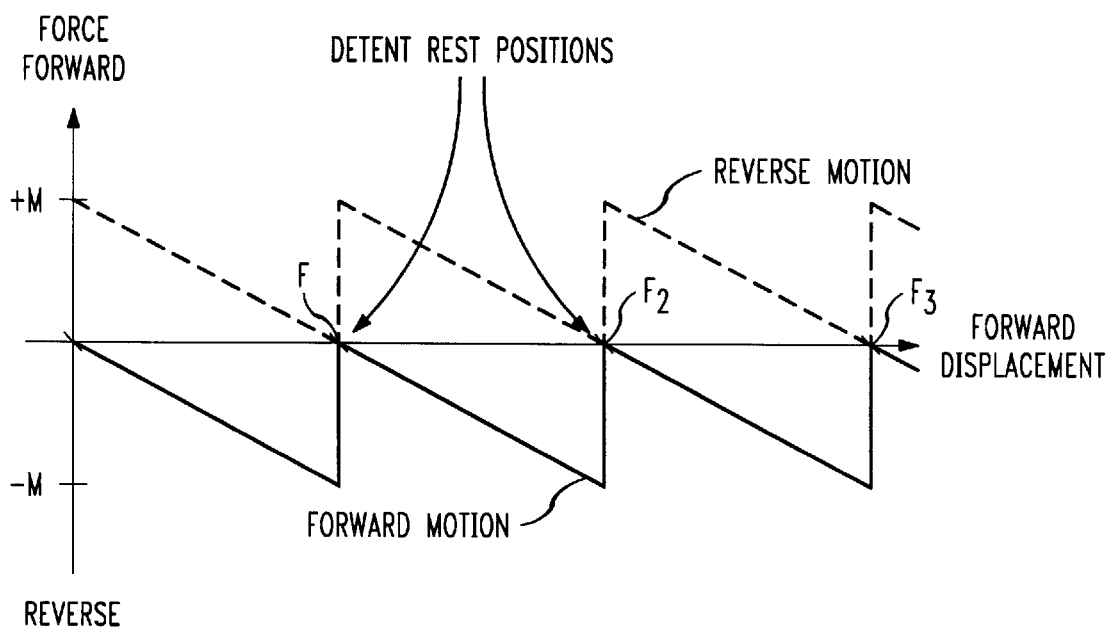

FIG. 4B depicts the force profile vs. displacement when no brake slippage is allowed to occur. As shown, forward motion of ball 20 occurs to the point where maximum reverse force −M is being applied. If ball 20 were released by the user's hand before reaching this point, it would return to detent rest position F. If forward motion of ball 20 is carried beyond the point where maximum reverse force −M is reached, drive electronics 23, based on the cursor control signals, activates solenoid/actuator 22 momentarily, and ball 20 is released and new detent rest position $F_2$ is achieved. Such a gripping brake detent action can be achieved by providing relatively strong spring 25, a relatively weak spring 34 and/or increasing the amount of friction between ball 20 and brake pad 21.

As alluded to earlier, the embodiments of the present invention shown in FIGS. 2A, 2B and 3 take advantage of human perception and motor dynamics to achieve a detent-like tactile feedback. For example, to roll the track-ball forward, a forward (positive) force is applied by the user's hand. This applied force is initially balanced by the reverse (negative) braking drag or spring force of the detent mechanism. Because human motor control reaction time is slow compared to the brake release interval, the forward (positive) force applied by the user's hand tends to remain constant over the release interval. At the point where the drag or restoring force is reset to zero, the net force applied to the track-ball tends to be positive which, as a result, causes the track-ball to accelerate forward until the drag is restored or the spring's reverse force maximum is approached again. What is felt by the user as the brake is released is the sensation that the ball is being kicked forward which is perceived by the user to be very similar to that of a conventional detent mechanism.

It should be noted that the braking force applied to the ball as shown in FIGS. 2A, 2B and 3 under certain circumstances may not yield the desired results for a mouse input/output device. For example, in the style mouse that is intended to roll over a table top or mouse pad, if a brake pad is applied to the mouse ball while it is being rolled over the mouse pad, the braking drag would compete with the mouse pad for traction which could prevent the ball from rolling, which in turn would result in failure of cursor response. In an alternative arrangement of a mouse employing direct optical or electrostatic sensing of a patterned mouse pad, there may be no internal moving parts upon which to apply braking force. In this instance, braking force may be applied directly to the pad below, over which the mouse rides.

Figure 5A:
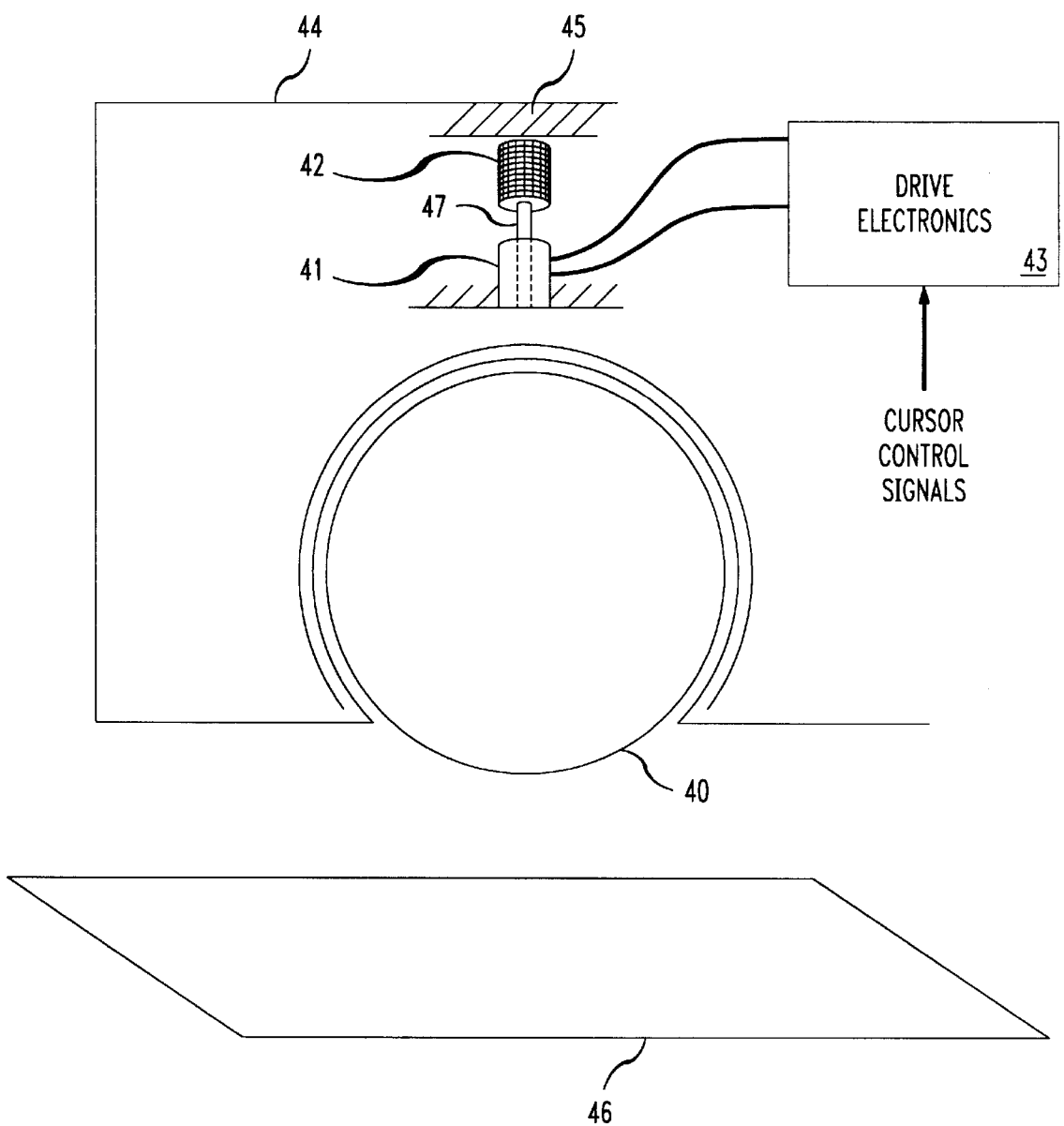
FIGS. 5A, 5B, 5C and 5D show devices for obtaining tactile feedback, according to other embodiments of the present invention.
Figure 5B:
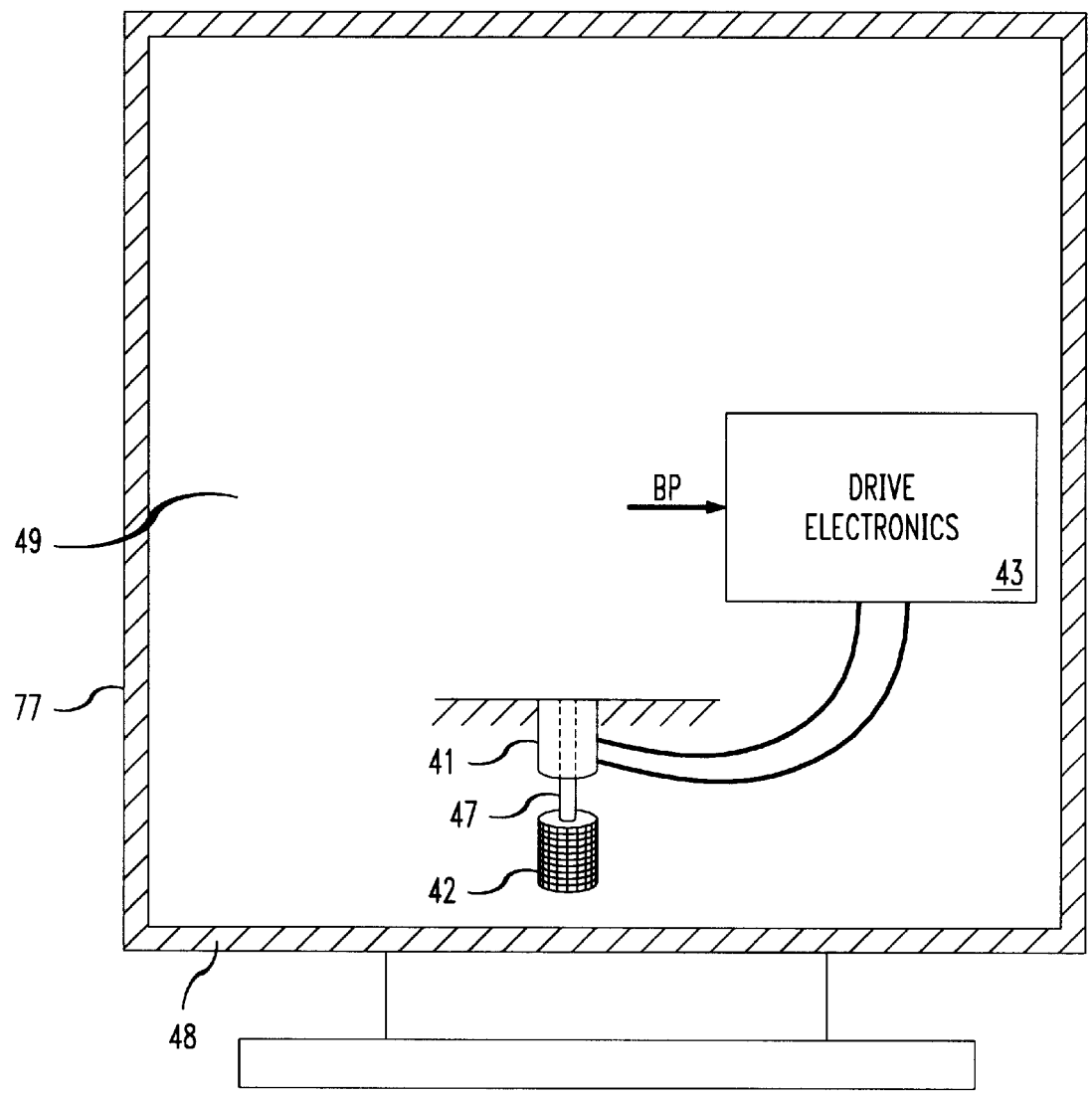
Figure 5C:
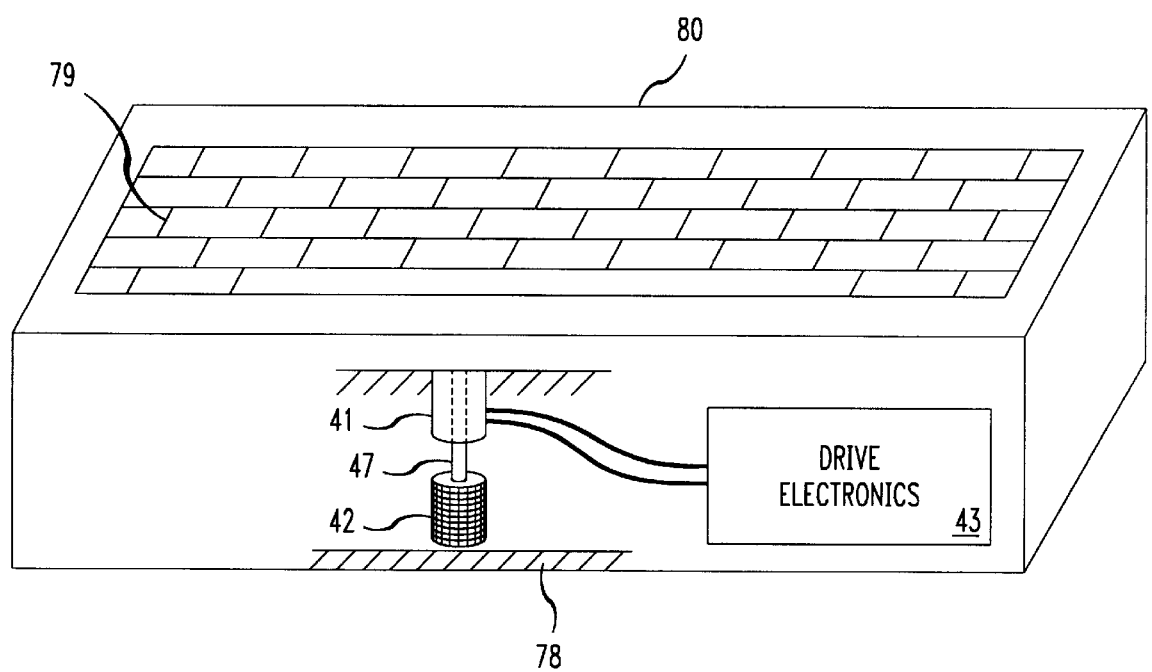
Figure 5D:
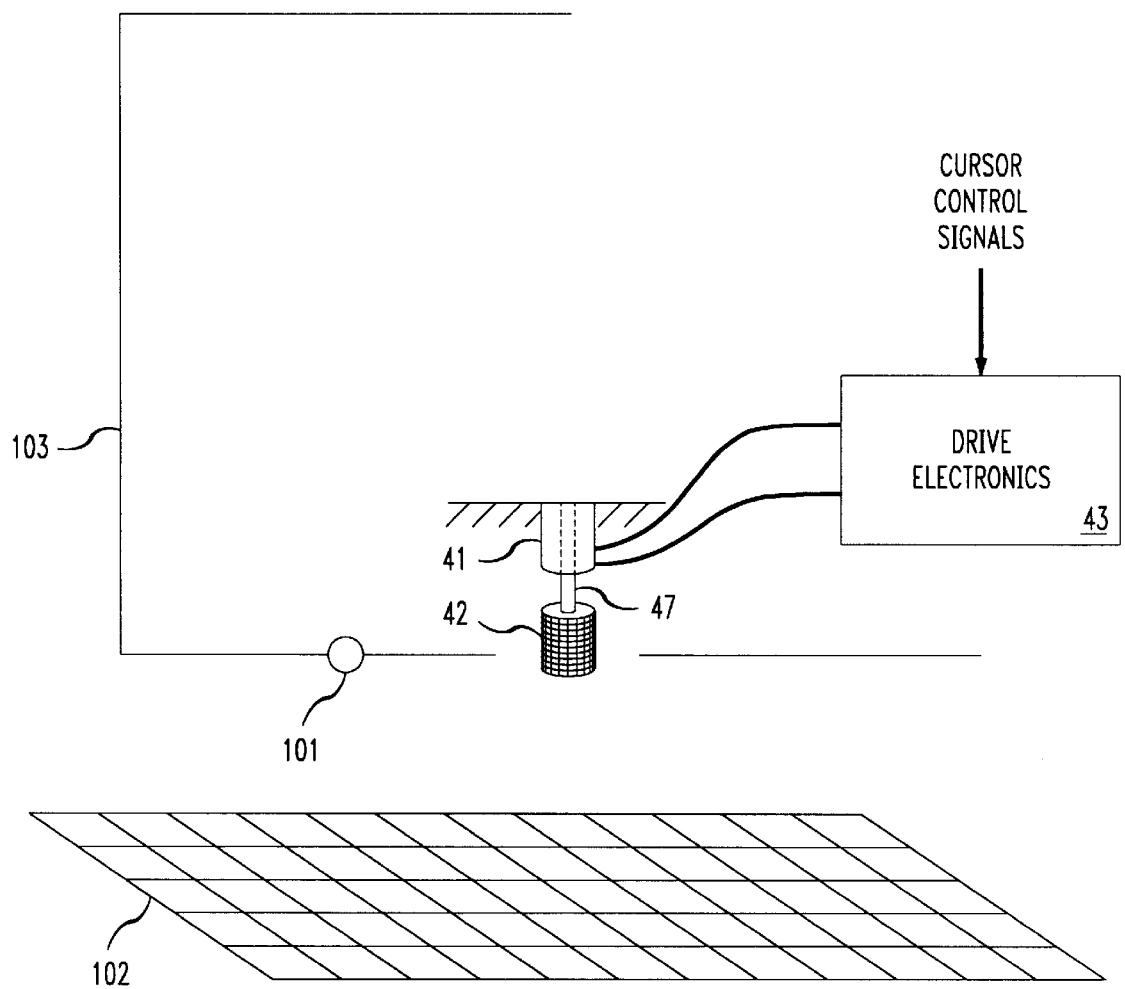

Such device for applying a braking force to the pad on which the device rides as disclosed herein, is shown, for example, in FIG. 5D. As shown, this mechanism includes solenoid/actuator 41, brake pad 42 and drive electronics 43. When the user slides mouse 103 over a grid-pad 102, a sensor 101 reports the displacement of mouse 103 as cursor control signals. Drive electronics 43, in response to cursor control signals, issues a short driving pulse that activates solenoid/actuator 41, retracting (or extending) push rod 47 causing brake pad 42 to be momentarily released from (or applied against) grid-pad 102 therefore producing a periodic drag which similarly mimics a detent-like tactile feedback.

A different type of tactile feedback can also be implemented by "thumping" the shell of a mouse input/output device (i.e. impacting it lightly) as the ball is rolled. In a track ball-like input/output device, thumping the track ball itself also brings desirable results, since the resultant sensation is similar enough to the feeling of a detent action. In other words, incorporating a mechanism to transmit an abrupt change in force to the hand of the user yields a sensation similar to the feel of a detent action.

Alternatively, it may be preferable to provide a thumping mechanism in the mouse input device. The device shown in FIG. 5A allows the mouse ball to roll while providing a synthesized detent-like action by thumping the shell of the mouse. As shown, this mechanism includes solenoid/actuator 41, inertial mass 42 and drive electronics 43. Drive electronics 43, in response to cursor control signals, issues a short driving pulse that activates solenoid/actuator 41, extending push rod 47, causing inertial mass 42 to "thump" shell 45 of mouse 44. The thumping of shell 45, which is in contact with the hand of the user, is felt by the user and therefore mimics a detent-like tactile feedback.

In a manner similar to that as indicated above, in the track ball device of FIG. 2B, the inertial mass 42 (from FIG. 5A) could be substituted for brake pad 21 in FIG. 2B to tap ball 20 and achieve a similar sensation of tactile feedback.

Other schemes of thumping can be implemented to provide tactile feedback to the user of a device having minimal or non-displacement style push/touch switches or keys. For example, such thumping may be applied to membrane switches or to a "Touch-Screen" visual display to provide a tactile feedback simulating a sensation of a button being pressed.

The device shown in FIG. 5B allows thumping of a "Touch-Screen" visual display casing when the display is touched by the user. As shown, this mechanism also includes solenoid/actuator 41, inertial mass 42 and drive electronics 43. "Touch-Screen" visual display 77 typically consists of a display screen 49 and sensors (not shown) located on casing 48 provided around the periphery of display screen 49. Display screen 49 typically displays a series of "buttons" having predefined functions. When a user touches display screen 49 at a position corresponding to a "button", decoding circuitry decodes the signals from the sensors and determine the position of the users finger to determine which "button" was "pressed". However, previously there was no way for a user to sense that the "button" was actually "pressed", until some sort of visual or audio indication was provided. (Such "Touch-Screen" visual displays are well known in the art and will not be described in further detail.)

The present invention can be used to provide a tactile feedback to the user of a "Touch-Screen" visual display to indicate that the "button" was "pressed". As noted above, decoding circuitry (not shown) receives the inputs from the sensors located around the periphery of display screen 49 and in response to touching display screen 49, provides a signal BP to drive electronics 43. Drive electronics 43 in response thereto issues a short driving pulse that activates solenoid/actuator 41, extending push rod 47, causing inertial mass 42 to tap casing 48 of "Touch-Screen" visual display 77. The thumping of casing 48 is felt by the user when the hand of the user is in contact with screen 49. In a manner similar to that as indicated above, inertial mass 42 may be positioned anywhere within "Touch-Screen" video display 77, at or near casing 48 for "thumping" casing 48 to achieve tactile feedback when screen" 49 is touched. In the alternative, display screen 49 can be thumped instead of casing 48.

Yet another "thumping" scheme may be implemented for membrane buttons on a non-mechanical keypad or keyboard, to obtain a tactile feedback simulating a button click. The device shown in FIG. 5C allows thumping of a keypad or a keyboard casing when a membrane button or key on a non-mechanical keyboard is touched. As in the device above, for example, the mechanism includes solenoid/actuator 41, inertial mass 42 and drive electronics 43. Drive electronics 43 receives an input from the decoding circuitry typically used for decoding the membrane keys 79. In response to the user touching a membrane key 79, drive electronics 43 issues a pulse that activates solenoid/actuator 41, extending push rod 47, causing inertial mass 42 to "thump" casing 78 of membrane keyboard 80. The tapping of casing 78 can be felt by the user when the user's hand is in contact with one of membrane keys 79. Inertial mass 42 may be positioned anywhere within membrane keyboard 80, at or near casing 78. Other applications of thumping schemes may be utilized on surfaces where there may be little or no deflection of the key, button or switch.

Figure 6:
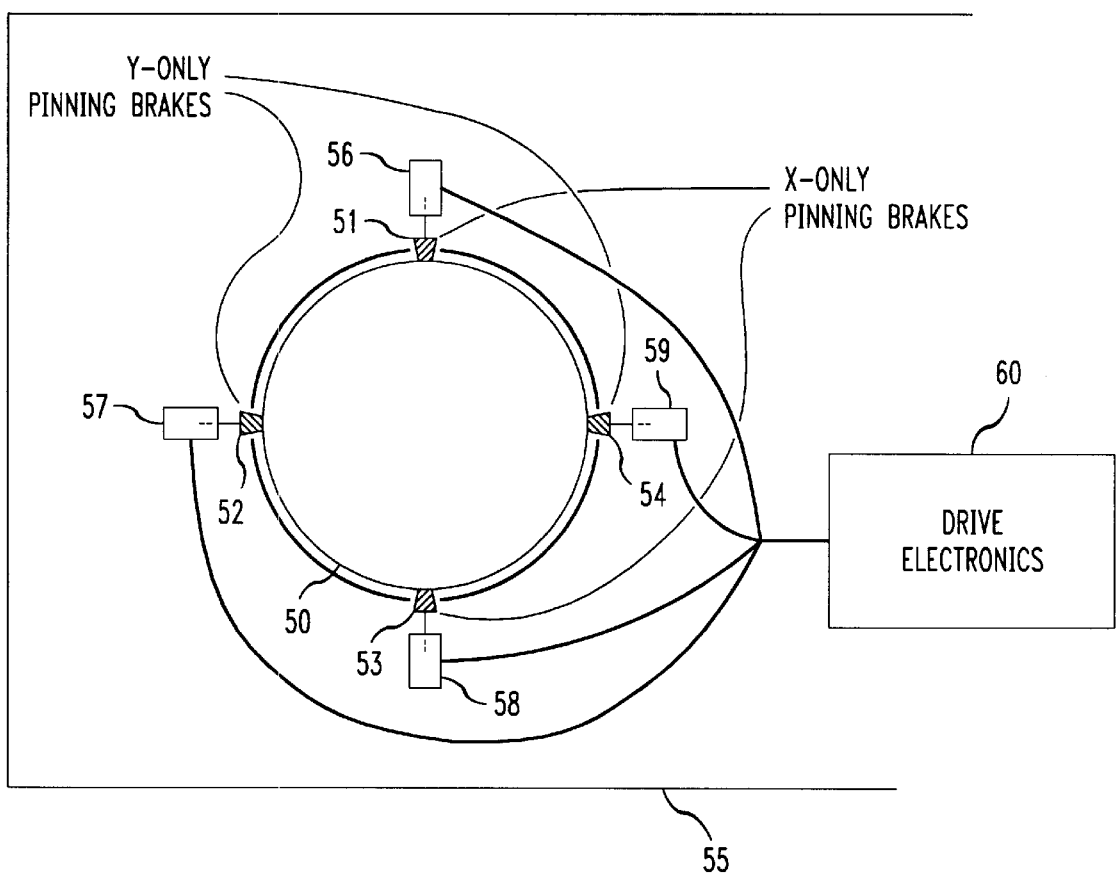
FIG. 6 shows a device for obtaining x-axis or y-axis guided motion according to an embodiment of the present invention.

Yet another embodiment for achieving tactile feedback is illustrated in FIG. 6. The device includes a set of four pinning brakes 51–54 which are moved by a set of four solenoid/actuators 56–59, respectively, by drive electronics 60. The four pinning brakes 51–54 are provided in a horizontal plane, along the equator of ball 50.

To achieve a guided motion along the y-axis direction, the solenoid/actuators corresponding to pair or brakes 52 and 54 (opposite one another, left and right) are selectively activated by solenoid/actuators 57 and 59, respectively, hence pinning the ball at these two points, and the pair of brakes 51 and 53 (opposite to one another, top and bottom) are released by solenoid/actuators 56 and 58, respectively, so that ball 50 is restricted from moving along the x-axis direction but allowed to rotate freely about the x-axis providing guided motion along the y-axis direction.

Similarly, to achieve a guided motion along the x-axis direction, the solenoid/actuators corresponding to pair of brakes 51 and 53 (opposite one another, top and bottom) are selectively activated by solenoid/actuators 56 and 58, respectively, hence pinning the ball at these two points, and the pair of brakes 52 and 54 (opposite to one another, left and right) are released by solenoid/actuators 57 and 59, respectively, so that ball 50 is restricted from moving along the y-axis but allowed to rotate freely about the y-axis providing guided motion along the x-axis direction.

Selectively activating and deactivating the x-pair and y-pair of brakes allows the user to guide the cursor along x-only or y-only directions. In addition, the released pair of brakes, which are not used for the guided x or y motion, may be used to create a detent-like tactile feedback by momentarily pinning track ball 50 at certain stop positions.

It is possible to achieve guided motion of the track ball along an arbitrary path with this embodiment, by mounting the brake assembly on a turret and rotating it about a vertical axis (normal to the page) in response to feedback from the connected computer or brake mechanism's drive electronics. As an alternative to a turret, an array of pinning brakes may be distributed around the track ball's equator and pairs of the brakes may be selectively actuated to achieve the desired result.

It will be appreciated that the foregoing description and drawings are only intended to be illustrative of the present invention. Variations, changes, substitutions and modifications of the present invention may occur to those skilled in the art without departing from the spirit and scope of the present invention. Accordingly, it is intended that the present invention be limited only by the scope of the appended claims.

What is claimed is:

1. An apparatus for providing detent-like tactile feedback to a user, comprising:

a shell;

a rolling member rotatably confined within the shell, the rolling member being capable of engaging a plurality of movable friction producing contact points;

a motion sensing mechanism for determining an amount of displacement of the rolling member when the rolling member is rotated;

at least one actuator provided in relation to said shell; and at least one brake member having a longitudinal axis and operatively associated with each of the plurality of movable friction producing contact points, the at least one brake member provided with respect to the at least one actuator, the at least one actuator extending and retracting the at least one brake member along the longitudinal axis of the at least one brake member to move the plurality of movable friction producing contact points along the longitudinal axis of the at least one brake member to selectively prevent the rolling member from rotating within the shell, based on the amount of displacement of the rolling member.

2. An apparatus as recited in claim 1, further comprising at least one spring member for providing a restoring force, the at least one spring member having a first end connected to the at least one actuator and a second end connected to the at least one brake member.

3. An apparatus as recited in claim 2, wherein the at least one actuator is connected directly to the at least one brake member.

4. An apparatus as recited in claim 1, wherein said motion sensing mechanism includes drive electronics for selectively activating the at least one actuator to retract and extend the at least one brake member.

5. An apparatus as recited in claim 4, wherein the drive electronics selectively activate the at least one actuator based on the amount of displacement of the rolling member.

6. An apparatus as recited in claim 1, further comprising at least one brake force loading spring provided between the at least one actuator and the shell for pushing against said shell and urging the brake member toward the rolling member.

7. A method for providing tactile feedback to a user, comprising the steps of:

rotatably displacing a rolling member within a shell, the rolling member being capable of engaging a plurality of movable friction producing contact points;

determining the displacement of the rolling member when the rolling member is rotatably displaced; and retracting and extending at least one brake member operatively associated with each of the plurality of movable friction producing contact points along a longitudinal axis of the at least one brake member to move the plurality of movable friction producing contact points along the longitudinal axis of the at least one brake member to selectively influence the rotation of the rolling member based on the displacement of the rolling member.

* * * * *